US012693265B2

(12) United States Patent
De Frutos Galindo et al.

(10) Patent No.: US 12,693,265 B2
(45) Date of Patent: Jul. 28, 2026

(54) TOOL AND SYSTEM FOR EDDY CURRENT INSPECTION

(71) Applicant: Airbus Operations S.L.U., Getafe (ES)

(72) Inventors: Yolanda De Frutos Galindo, Getafe (ES); Carlos Jusdado Serrano, Getafe (ES); Alejandro Arnaez Barrio, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 174 days.

(21) Appl. No.: 18/344,289

(22) Filed: Jun. 29, 2023

(65) Prior Publication Data
US 2024/0102964 A1     Mar. 28, 2024

(30) Foreign Application Priority Data
Sep. 27, 2022     (EP) .................................... 22382890

(51) Int. Cl.
G01N 27/90 (2021.01)
G01N 27/904 (2021.01)

(52) U.S. Cl.
CPC ..... G01N 27/9046 (2013.01); G01N 27/9006 (2013.01); G01N 27/904 (2013.01)

(58) Field of Classification Search
CPC .... G01N 27/48; G01N 27/90; G01N 27/9046; G01N 27/9006; G01N 27/904; G01N 27/902
See application file for complete search history.

(56) References Cited

U.S. PATENT DOCUMENTS

| | | | |
|---|---|---|---|
| 3,449,664 A | 6/1969 | Smith | |
| 7,352,176 B1 | 4/2008 | Roach | |
| 2005/0237055 A1 | 10/2005 | Sun et al. | |
| 2013/0181701 A1 | 7/2013 | Galbraith et al. | |
| 2015/0212113 A1 | 7/2015 | Bangsund et al. | |
| 2022/0219306 A1* | 7/2022 | Greaney | B25D 17/02 |
| 2022/0288769 A1* | 9/2022 | Zolno | B25F 5/00 |
| 2023/0280077 A1* | 9/2023 | Dziedzic | A45C 3/001 62/457.1 |
| 2024/0067002 A1* | 2/2024 | Voss | H01M 50/204 |

FOREIGN PATENT DOCUMENTS

| | | | | |
|---|---|---|---|---|
| CN | 111351847 A | * | 6/2020 | ......... G01N 27/9093 |
| WO | 2017179567 A1 | | 10/2017 | |

OTHER PUBLICATIONS

Navair 01-1A-16-1, Nondestructive Inspection Methods, Basic Theory (Year: 2016).*
European Search Report for corresponding European Patent Application No. 22382890 dated Mar. 6, 2023; priority document.

* cited by examiner

*Primary Examiner* — Lee E Rodak
*Assistant Examiner* — Jeremiah J Barron
(74) *Attorney, Agent, or Firm* — Greer, Burns & Crain, Ltd.

(57)     ABSTRACT
A tool for eddy current inspection is configured to be used with an inspection device, and includes one or more guides, wherein the, or each, guide is a disc, which may be a plastic disc. Each disc includes an adhesive on one of its surfaces, the adhesive being a detachable adhesive, i.e., it is a weak adhesive that allows removal of the disc after inspection and re-use of the disc again at another fastener position.

12 Claims, 1 Drawing Sheet

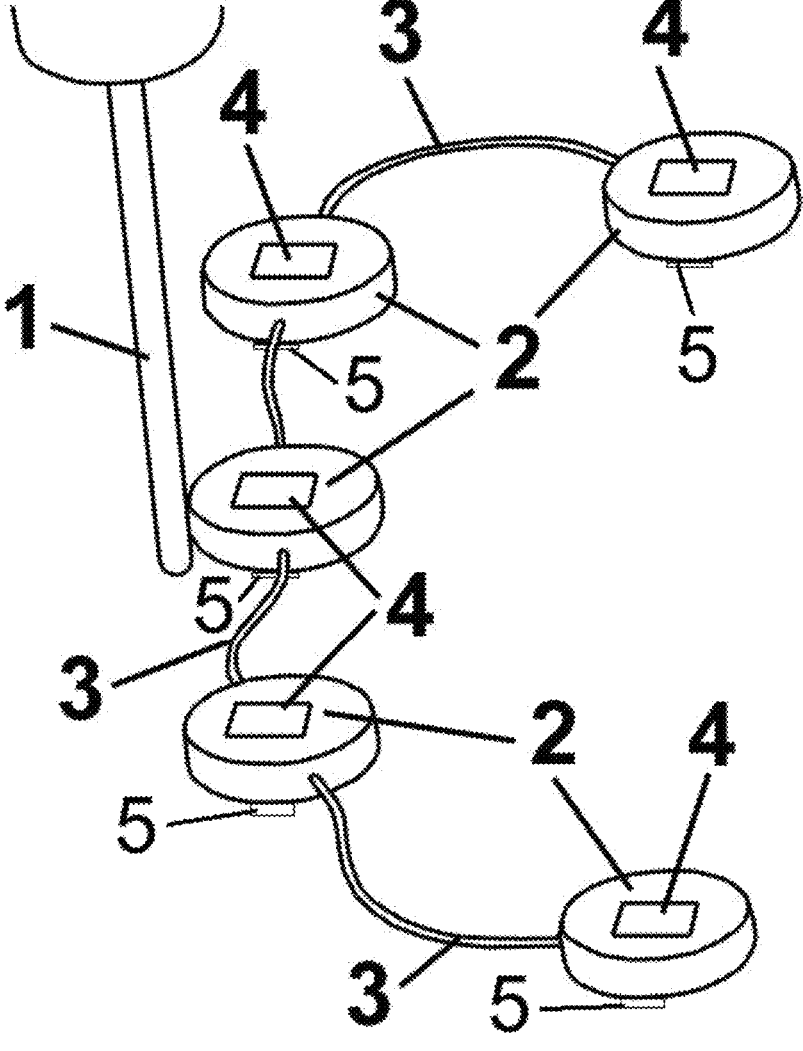

TOOL AND SYSTEM FOR EDDY CURRENT INSPECTION

CROSS-REFERENCES TO RELATED APPLICATIONS

This application claims the benefit of the European patent application No. 22382890.6 filed on Sep. 27, 2022, the entire disclosures of which are incorporated herein by way of reference.

FIELD OF THE INVENTION

The present invention relates to a tool and system for eddy current (ET) inspection, in particular, around countersunk fasteners in aircraft.

BACKGROUND OF THE INVENTION

During the aircraft in-service life, the inspections based on eddy current (ET) are more than 90% of the maintenance non-destructive inspections (NDT) of the metallic structure.

Among the ET inspections one can differentiate high frequency (HFEC), low frequency (LFEC) and rototest inspections, and the later requires the fastener removal to do the inspection.

HFEC and LFEC are performed without fastener removal and currently by sliding the inspection device (such as a probe) around the fastener head in order to detect cracks growing radially from the fastener hole.

By using HFEC, the cracks open to the surface where probe is sliding are detected. LFEC technique is used to detect cracks running at the opposite surface of the part or at a metallic part deeper in the stacking.

When performing the ET inspection around a protruding fastener or around the collar, the edge of these elements is used as a guide to slide the probe.

For the inspection around countersunk fasteners, the head edge cannot be used as a guide for the ET inspection, so that currently it is recommended to use a circle template for that purpose.

The purpose of the circle template is to allow the probe to slide as close as possible to the hole edge (which gets better detectability) while preventing it from moving onto the edge (which would produce a false crack indication). In fact, the circle template edge is using as the guide for the probe.

However, these currently known tools using circle templates have some problems, such as:

Bad adaptation of the circle template to curved surfaces.

Assembly elements, such as collars, clips, etc., prevent the circle template from being placed correctly.

The NDT inspector must hold the template in its proper position avoiding movements while sliding the probe and adjusting the eddy current instrument controls, if necessary to modify the adjustment. In practice, this means two inspectors to perform the task or increase inspection time.

Sometimes the template moves slightly as the probe leans against its edge which can cause false crack indication when sliding the probe at the opposite hole side.

SUMMARY OF THE INVENTION

With the tool and system for eddy current inspection of the invention, the disadvantages are solved, presenting other advantages that will be described below.

In particular, the tool for eddy current inspection according to the present invention comprises one or more guides for guiding an inspection device, the, or each, guide being a disc.

Preferably the, or each, disc comprises an adhesive on one of its surfaces, in particular, a detachable or weak adhesive that allows a fixing of the disc on a surface, e.g., the head of a countersunk fastener, and after the inspection is carried out, a removal of the disc from this location and enabling a using of the disc again for another inspection in another location.

Preferably, the tool comprises multiple discs which are connected to each other by a wire.

According to a preferred embodiment, each disc has a thickness of more than 1 mm.

The, or each, disc, and also the wire are made from a non-electric conductive material, for instance, plastic.

Advantageously the, or each, disc has an engraving indicating the diameter of the disc, so that the user can easily know the disc that has to be used according to the diameter of the fastener around which the inspection is carried out.

When the tool comprises a plurality of discs, they can have the same or different diameters.

The tool and system for eddy current (ET) inspection according to the present invention provides a template to help the inspection, which provides the following advantages, among others:

It is smaller than the currently known tools to improve the adaptability to curved parts and to avoid interference with near elements;

It is easier in use;

It is kept fixed to the inspection surface to give the inspector more autonomy and preventing false indication;

It saves inspection time.

BRIEF DESCRIPTION OF THE DRAWINGS

For better understanding of what has been disclosed, some drawings in which, schematically and only by way of a non-limiting example, a practical case of embodiment is shown.

The FIGURE is a perspective view of one embodiment of the system for eddy current inspection according to the present invention, comprising several discs connected to each other by a wire.

DETAILED DESCRIPTION OF THE PREFERRED EMBODIMENTS

The tool and system for eddy current inspection according to the present invention is specially designed for its use with countersunk fasteners in aircraft.

The system comprises an inspection device 1, such as a probe, and a tool for eddy current inspection. The tool comprises one or more discs 2, which are made of a non-electric conductive material, for instance plastic, and have a side with an adhesive, having the same diameters of the countersunk fasteners around which the eddy current is to be inspected.

The thickness of the discs 2 is enough to prevent the inspection device 1 from sliding over it, such as, e.g., 1 mm.

Furthermore, each disc 2 includes an adhesive 5 (see FIG. 1, shown in graphical form), in particular, a detachable adhesive, on its lower surface, i.e., a weak adhesive that allows removal of the disc after inspection and allows re-use of the disc again at other fastener positions.

Preferably, the value of the diameter of the disc 2 can be shown by an engraving 4 on each disc 2, so that the user can use the disc 2 with the correct diameter, which corresponds with the diameter of the fastener around which the eddy current is to be inspected.

The disc 2, adhered to the inspection surface just over the countersunk head of the fastener, is used as a guide to slide the inspection device around the disc.

Additionally, and quite important from the foreign object damage (FOD) prevention point of view, same diameter discs 2, e.g., in a group of 10-12 discs, can be connected in a flexible manner to avoid risk of FOD, e.g., by a wire 3 made from a non-electric conductive material, for instance, plastic, that allows each plastic disc 2 to slide for using on any pitch (spacing) fasteners row.

The use of the tool according to the present invention is very simple, as the user just selects the correct disc 2 according to the diameter of the fastener, and due to its adhesive 5 on the lower surface, the disc is fixed on the fastener. Once fixed, the disc 2 serves as a guide for the inspection device 1.

After the inspection, the user can remove the disc 2 easily due to the weak adhesive, and re-use the disc 2 afterwards for another inspection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool for eddy current inspection, configured to be used with an inspection device to inspect a fastener, comprising:

a plurality of guides;

a plurality of discs, wherein each guide in the plurality of guides comprises a corresponding disc from the plurality of discs, each disc having a diameter equal to a diameter of the fastener, wherein each guide in the plurality of guides is connected to another guide in the plurality of guides by a wire, and wherein each disc comprises a detachable adhesive on a surface thereof configured to fix the disc to the fastener, such that the disc remains stationary relative to the fastener while the inspection device is slid along a peripheral edge of the disc during inspection.

2. The tool for eddy current inspection according to claim 1, wherein each guide comprises an adhesive on one surface thereof.

3. The tool for eddy current inspection according to claim 2, wherein the adhesive is a detachable adhesive.

4. The tool for eddy current inspection according to claim 1, wherein each guide has a thickness of more than 1 mm.

5. The tool for eddy current inspection according to claim 1, wherein each guide is made from a non-electrically conductive material.

6. The tool for eddy current inspection according to claim 5, wherein the non-electrically conductive material comprises plastic.

7. The tool for eddy current inspection according to claim 1, wherein the wire is made from a non-electrically conductive material.

8. The tool for eddy current inspection according to claim 7, wherein the non-electrically conductive material comprises plastic.

9. The tool for eddy current inspection according to claim 1, wherein each disc of the plurality of discs has an engraving indicating a diameter size of the disc.

10. The tool for eddy current inspection according to claim 1, wherein the plurality of discs each have an identical diameter.

11. The tool for eddy current inspection according to claim 1, wherein the plurality of discs each have a different diameter.

12. A system for eddy current inspection comprising an inspection device and a tool according to claim 1.

\* \* \* \* \*